UNITED STATES PATENT OFFICE.

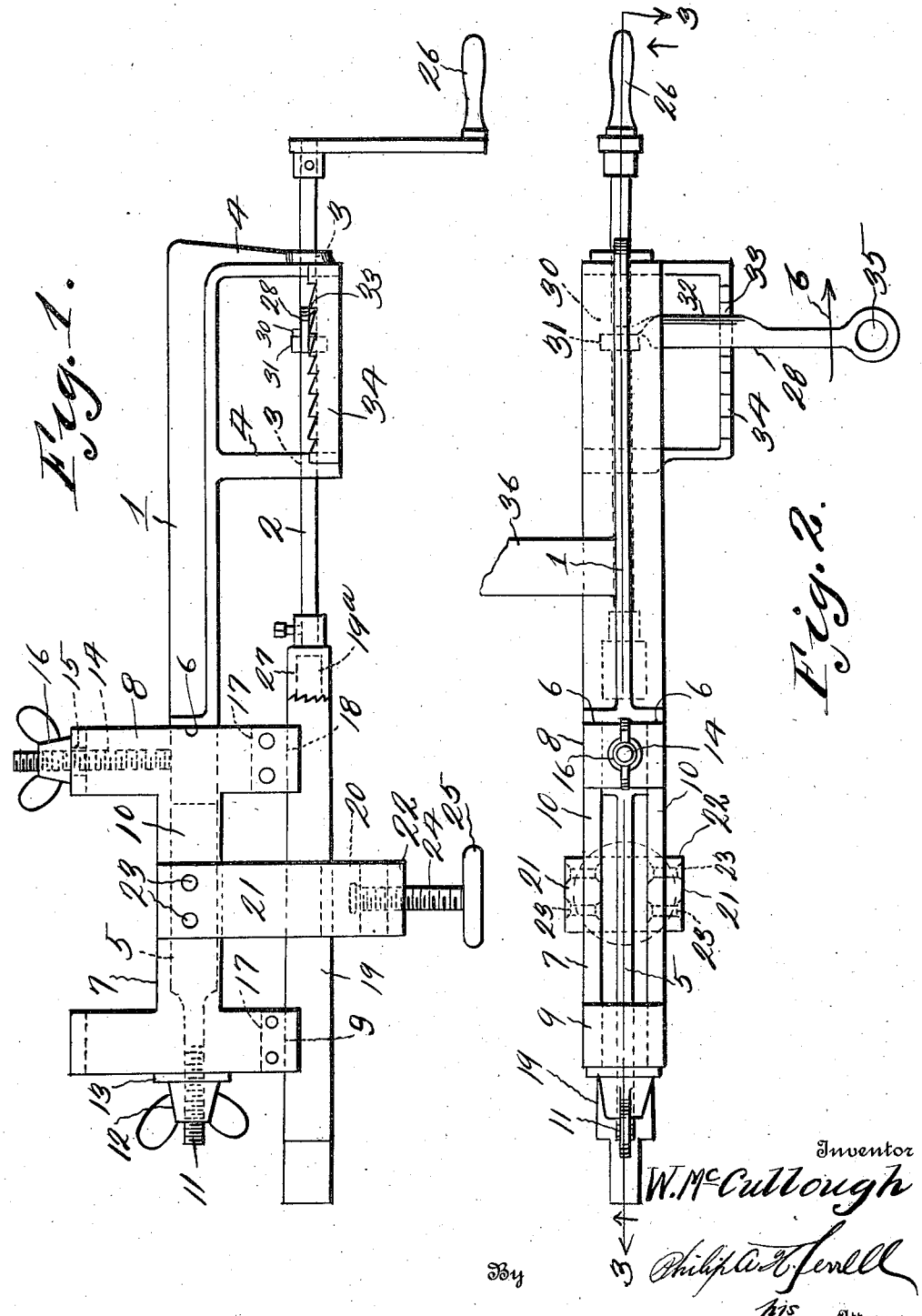

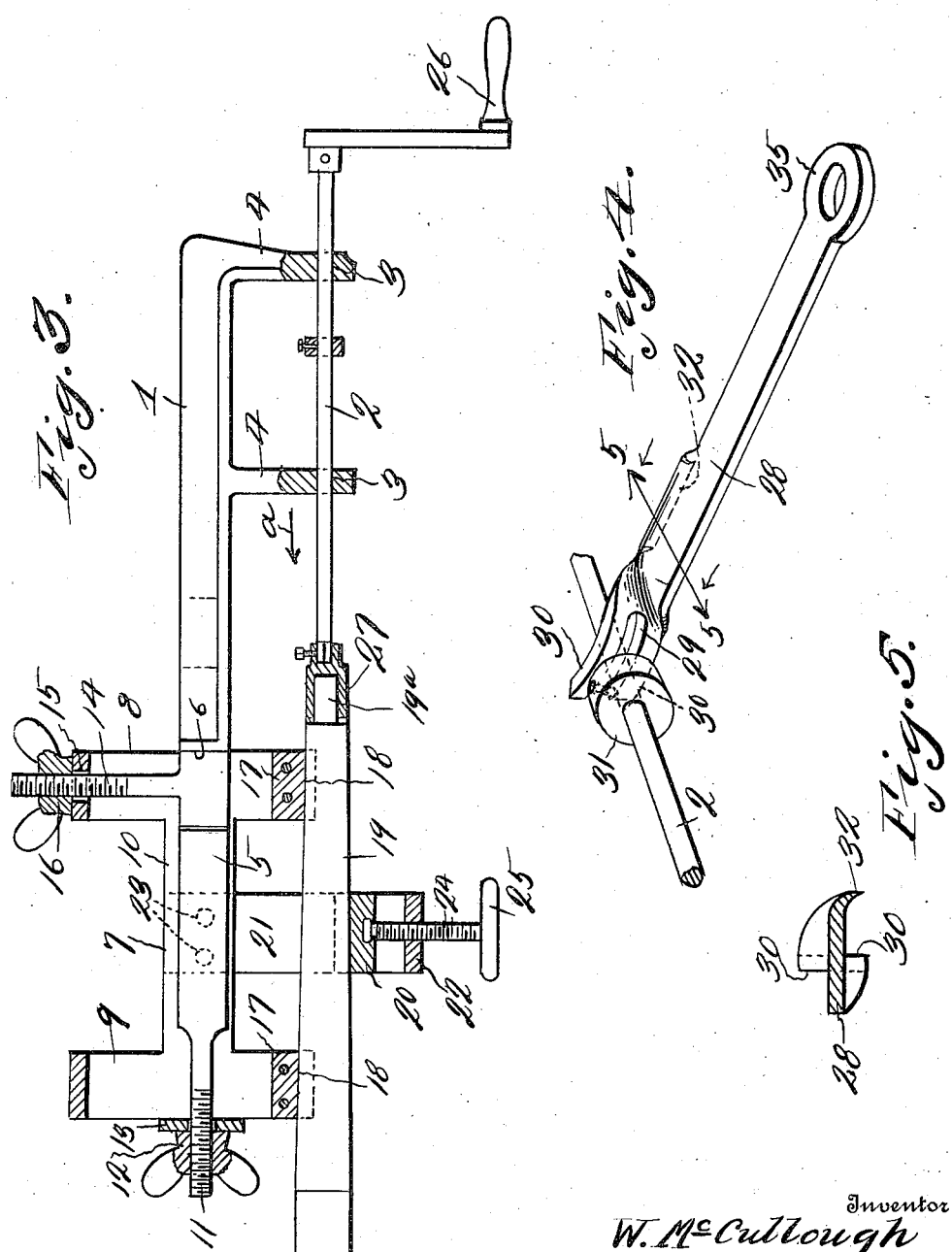

WILLIAM McCULLOUGH, OF HOWE, NEBRASKA.

SPOKE-FORMING DEVICE.

1,425,785.	Specification of Letters Patent.	Patented Aug. 15, 1922.

Application filed September 24, 1921. Serial No. 502,373.

*To all whom it may concern:*

Be it known that WILLIAM McCULLOUGH, a citizen of the United States, residing at Howe, in the county of Nemaha and State of Nebraska, has invented certain new and useful Improvements in Spoke-Forming Devices, of which the following is a specification, reference being had therein to the accompanying drawing.

The invention relates to spoke shaping devices, and has for its object to provide a device of this character comprising a horizontally disposed member having rotatably and slidably mounted therein a horizontally disposed cutter carrying chair having a crank at one end thereof, said horizontally disposed member being provided with a reduced portion, on which reduced portion a spoke holding member is mounted and adjustably held in axial alignment whereby the spoke carried thereby will be axially held in relation to the rotatably and slidably mounted cutter carrying chair.

A further object is to provide a horizontally disposed toothed rack extending outwardly from the horizontally disposed member and with which rack a lever engages, which lever is provided with a bifurcation, the arms of which are moved on opposite sides of the rotatable shaft and engage a collar thereon, and forms means for feeding the rotatable and slidable shaft during a spoke cutting operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the device.

Figure 2 is a top plan view.

Figure 3 is a vertical longitudinal sectional view through the device taken on line 3—3 of Figure 2.

Figure 4 is a detailed perspective view of the feeding lever and a portion of the cutter shaft.

Figure 5 is a detail sectional view taken on line 5—5 of Figure 4.

Referring to the drawings, the numeral 1 designates an elongated body member horizontally disposed and 2 a rotatably and slidably mounted cutter shaft, which is mounted in bearings 3 of arms 4 of the member 1 and is horizontally disposed. The member 1 may be supported in any suitable manner and held against movement during a spoke shaping operation. Member 1 is provided with a reduced portion 5, which reduced portion forms shoulders 6, and on said reduced portion is vertically slidable a spoke supporting member 7, said member 7 comprising spaced U-shaped members 8 and 9, which U-shaped members have one of their arms disposed on each side of the reduced portion 5, and are connected together by the horizontally disposed bars 10 located on each side of the reduced portion 5. The outer end of the reduced portion 5 terminates in a threaded portion 11, on which portion is threaded a thumb nut 12, which engages a washer 13 and forces the same into frictional and binding engagement with the outer side of the U-shaped member 9, and the forward edge of the U-shaped member 8 into frictional and binding engagement with the shoulders 6 of the member 1, thereby holding the supporting member 7 in various vertical positions. To additionally hold the supporting member 7, the reduced portion 5 of the member 1 is provided with a vertically disposed threaded shaft 14, which shaft extends upwardly through an aperture in the transverse portion of the U-shaped member 8, and has threaded thereon a thumb nut 16, which thumb nut and threaded shaft 14 forms means for accurately gaging the position of the supporting member 7 and holding said supporting member until it is securely clamped by the thumb nut 12 and washer 13. Secured between the lower ends of the arms of the U-shaped members 8 and 9 are notched blocks 17, in the notches 18 of which a conventional form of spoke 19 is held by means of a vertically movable notched block 20, which block is mounted between arms 21 of a U-shaped member 22, which member arches the spoke 19, and has its arms secured at 23 to the horizontally disposed bars 10. The block 20 has pivotally connected thereto an operating screw 24 which operating screw is provided with a hand wheel 25, by means of which hand wheel the operating screw 24 may be rotated, and the notched block 20 forced upwardly into clamping engagement with the spoke 19.

It will be seen that by manipulating the thumb screw 12 and member 7 after the spoke 19 has been placed in position that the spoke 19 may be accurately positioned in axial alignment with the rotatable and slidable cutter shaft 2 so that when the shaft 2 is rotated by means of the handle 26 and forced in the direction of arrow $a$, the cutter 27 will form the tenon 19$^a$ on the end of the spoke 19, thereby accurately positioning the tenon 19$^a$ in relation to the axis of the spoke 19 and forming the same quickly at a minimum cost and with a minimum loss of time.

During the rotation of the shaft 2, it will be necessary for the shaft 2 to move in the direction of the arrow $a$ in its bearings 3. To accomplish this result during the rotating operation a lever 28 is provided, which lever is provided with a bifurcation 29 which receives the shaft 2 in such a manner that the arms 30 of the lever will engage an adjustably mounted collar 31 carried by the shaft 2. Lever 28 is provided with a downwardly extending lip 32, which lip engages one of the teeth 33 of a horizontally disposed toothed rack 34, which rack extends outwardly from the downwardly extending arms 4 of the member 1. In operation the operator grasps the handle 26, preferably with his right hand, and with his left hand he grasps the outer end 35 of the lever 28 and forces the same in the direction of the arrow $b$, which action will cause the shaft 2 to feed in the direction of the arrow $a$ during a spoke shaping operation. The device may be supported in any suitable manner, however for purposes of illustration an outwardly extending arm 36 is shown, which arm may be supported in any suitable manner, for instance in a vice, however it is to be understood that the device may be supported in any suitable manner.

From the above it will be seen that a spoke shaping device is provided which is simple in construction, easily adjusted and one which may be operated by a single person.

The invention having been set forth what is claimed as new and useful is:—

1. The combination with a horizontally disposed member having a spoke cutter shaft rotatably and slidably mounted in bearings thereof, of a spoke supporting member therefor, said supporting member being mounted on a reduced portion of the horizontally disposed member and vertically slidable thereon in engagement with shoulders formed by the reduced portion, the outer end of the reduced portion being threaded, a nut threaded on said reduced portion and adapted to force the spoke supporting member in engagement with the shoulders formed by the reduced portion, a threaded member extending upwardly through the spoke supporting member and provided with a nut for feeding the spoke supporting member downwardly for accurately gaging the position of a spoke in relation to the cutter shaft, a handle member carried by said cutter shaft and means for feeding said cutter shaft in the direction of the spoke during a spoke cutting operation.

2. A spoke forming machine comprising a main body member, a horizontally disposed rotatable and longitudinally movable cutter carrying shaft carried by the body member, a vertically adjustable spoke carrying member mounted on a reduced portion of the body member, shoulders carried by said body member, means for forcing said spoke carrying member into engagement with said shoulders, means for clamping a spoke in said spoke carrying member in axial alignment with the cutter carrying shaft, an operating crank for said cutter shaft, a collar adjustably mounted on said shaft, a feeding lever provided with a bifurcation in which the shaft is received, the arms formed by said bifurcation engaging the adjustable collar, a toothed rack disposed below said operating lever and a downwardly extending tooth carried by said lever and adapted to engage one of the teeth of the toothed rack whereby the cutter shaft may be moved longitudinally.

In testimony whereof I hereunto affix my signature.

WILLIAM McCULLOUGH.